(12) United States Patent
Hunter

(10) Patent No.: US 6,914,698 B1
(45) Date of Patent: Jul. 5, 2005

(54) DYNAMIC SMART ALBUM PAGE LAYOUTS IN A DIRECT CONNECT PRINTER

(75) Inventor: Wendy F. Hunter, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 09/672,416

(22) Filed: Sep. 28, 2000

(51) Int. Cl.$^7$ .......................... G06F 15/00; G06F 12/00
(52) U.S. Cl. .................. 358/1.18; 358/1.16; 347/108; 348/207.2
(58) Field of Search ................... 358/1.16, 1.18; 347/168; 348/207.2

(56) References Cited

U.S. PATENT DOCUMENTS

| | | | |
|---|---|---|---|
| 4,603,966 A | 8/1986 | Brownstein | 355/45 |
| 5,300,974 A | 4/1994 | Stephenson | 354/75 |
| 5,493,409 A | 2/1996 | Maeda et al. | 358/296 |
| 5,606,420 A | 2/1997 | Maeda et al. | 358/296 |
| 5,917,548 A | 6/1999 | McIntyre | 348/333 |
| 5,946,031 A | 8/1999 | Douglas | 348/207 |
| 6,426,801 B1 * | 7/2002 | Reed | 358/1.16 |
| 6,456,391 B1 * | 9/2002 | Miyamoto et al. | 358/1.18 |
| 6,550,910 B2 * | 4/2003 | Hwang | 347/108 |
| 2003/0174213 A1 * | 9/2003 | Matsumoto et al. | 348/207.2 |

* cited by examiner

Primary Examiner—Edward Coles
Assistant Examiner—Alan Rahimi

(57) ABSTRACT

A method and apparatus are disclosed for printing image files, including a printer, with a receptacle for receiving a memory card for storing a plurality of image files. The printer further includes a user interface for enabling a user to enter selection commands, a display for showing messages, and a processor responsive to a first user input to print a sheet with reduced versions of the image files in a first sequence of the image files. The processor is further responsive to another user input for specifying at least one arrangement of the image files where they are all printed with the same orientation on a particular sheet.

24 Claims, 10 Drawing Sheets

| Fig. 5A |
| Fig. 5B |

Reading . . .

FIG. 7A

XX Photos
found on card

FIG. 7B

ALL PHOTOS
1 copy    Index

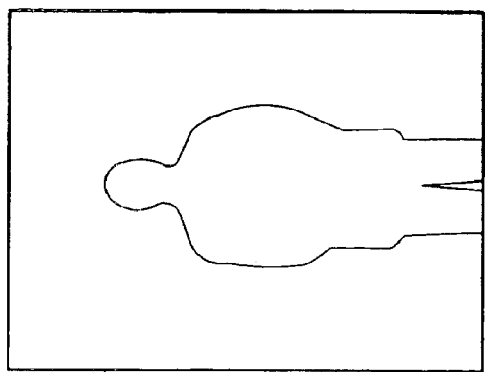
310
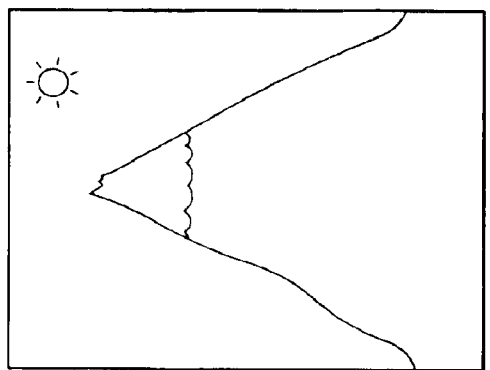
311
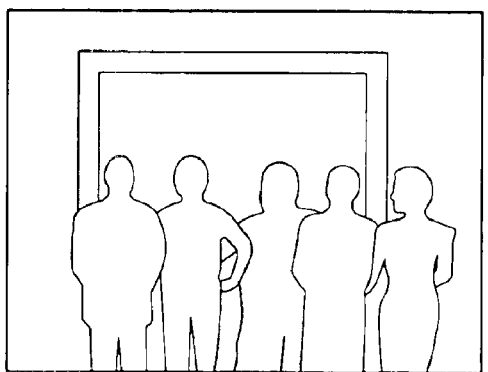
312
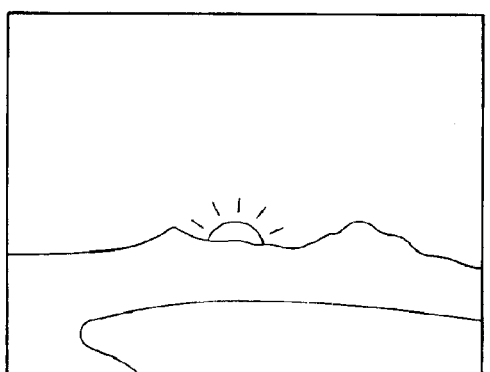
313
FIG. 9

DYNAMIC SMART ALBUM PAGE LAYOUTS IN A DIRECT CONNECT PRINTER

FIELD OF THE INVENTION

This invention relates to printers, and in particular to a method and apparatus for arranging items on a page for printing.

BACKGROUND OF THE INVENTION

Currently, electronic cameras are arranged to be able to download image files to an external computing device or directly to a printer, for subsequent reproduction by the printer. When printing such image files, page layouts of the images on the printed page are not generated automatically. A user typically chooses from a set of static layouts that are determined based upon the number of images per page. For example, if a user specifies one image per page, then the user is limited to a specific, predetermined layout of the image file. Such predetermined layouts do not account for the original size, orientation, or order of the image files, but simply arrange the image files according to a predetermined template.

Where a page contains images with different orientations, that is both portrait and landscape oriented images, viewing of some of the images is awkward. This is disadvantageous when a user would like to use the printed pages bound together in an album. These predetermined layouts further cause the image files to be printed in non-standard sizes, which do not correspond to typical album sleeves and picture frames. A user is also unable to select the order of the image files on a page, as the order is determined by the predetermined layout. As stated above with respect to orientation, a user may desire to display images in a specific order, for example, when showing a particular order of events.

Accordingly it is an object of this invention to provide a method and apparatus for printing image files, and to allow a user to specify parameters such that the image files will be printed in a particular order and size, and in a manner such that each image on a page has the same orientation

SUMMARY OF THE INVENTION

A method and apparatus are disclosed for printing image files, including a printer, with a receptacle for receiving a memory card that stores a plurality of image files. The printer further includes a user interface for enabling a user to enter selection commands, a display for showing messages, and a processor responsive to a first user input to print a sheet with reduced versions of the images in a first sequence of the images. The processor is further responsive to another user input to specify at least one arrangement of the images files where they are all printed with the same orientation on a sheet.

BRIEF DESCRIPTION OF THE DRAWINGS

FIGS. 7A, 7B, 7C and 7D show examples of messages displayed on a display of the printer.

FIG. 9 shows a schematic example of image files printed using a Paper Saver page layout setting.

DETAILED DESCRIPTION OF THE INVENTION

Figure 1:
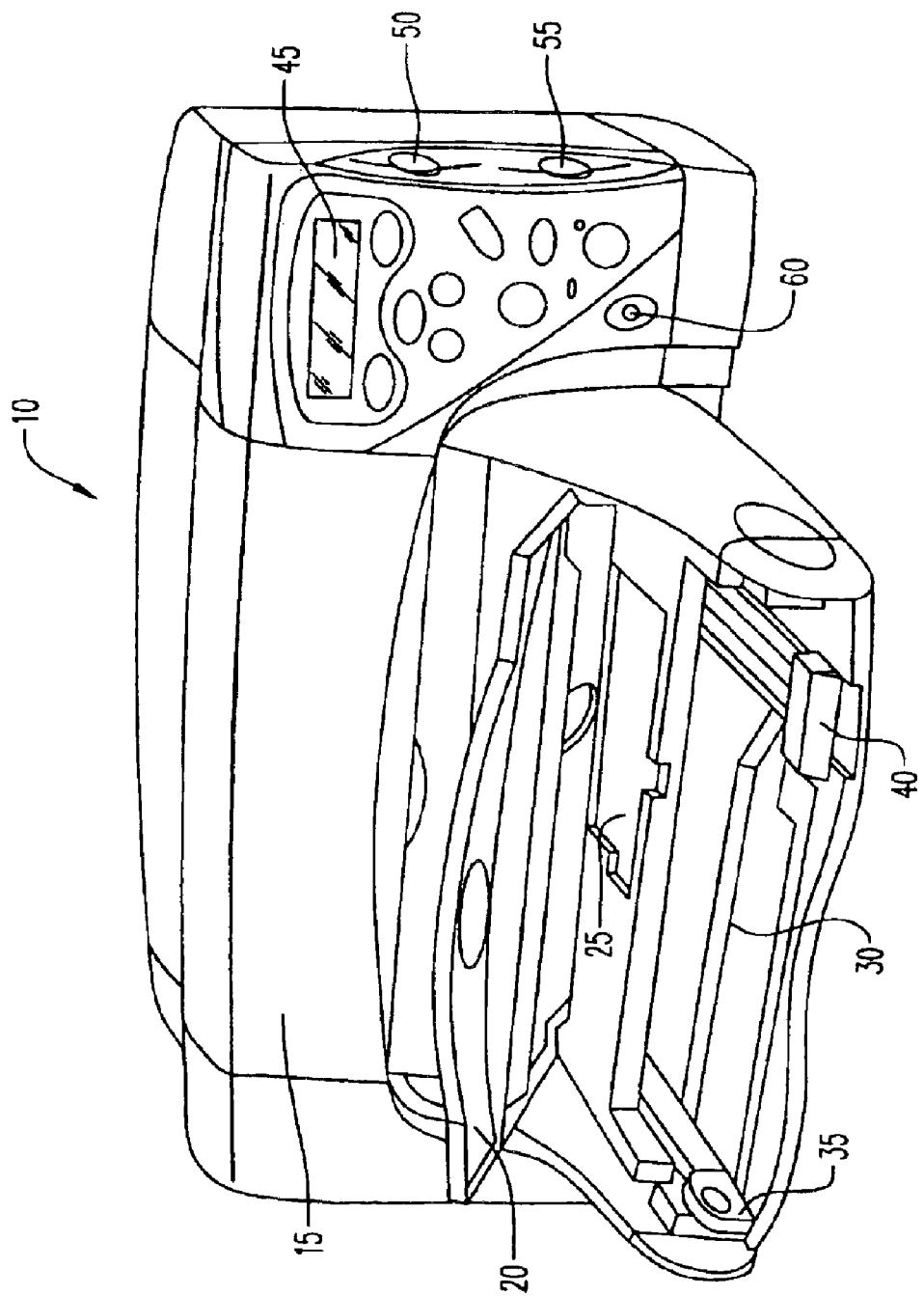
FIG. 1 shows a printer suitable for practicing this invention.

A printer 10 in which this invention is practiced is shown in FIG. 1. Printer 10 includes top cover 15, output tray 20, trays 25, 30 for media to be printed upon, paper guides 35, 40, display 45, memory card slots 50, 55, and power button 60.

Figure 2:
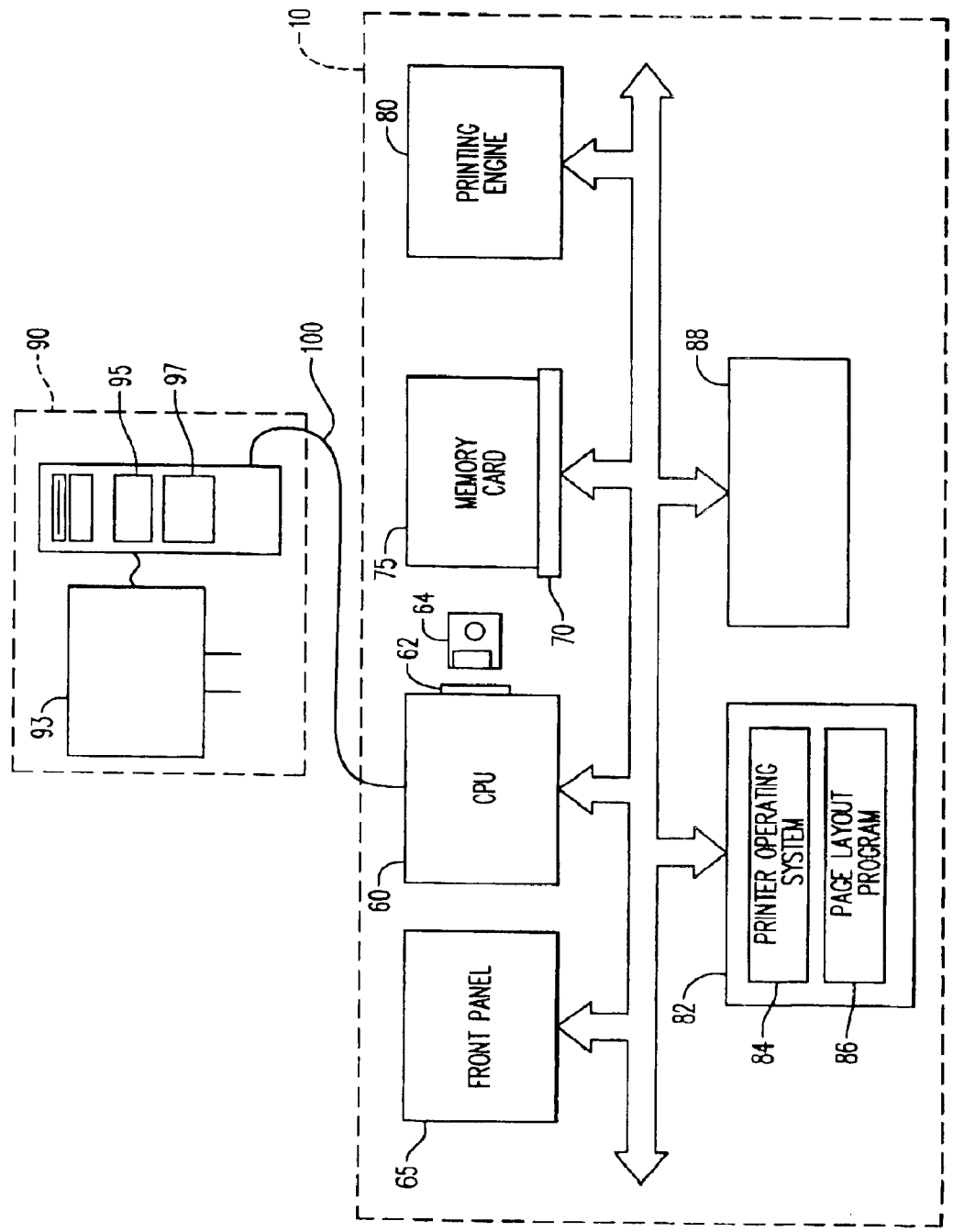
FIG. 2 shows a block diagram of the printer.

FIG. 2 shows a block diagram of printer 10. Printer 10 includes processor 60 for directing printer operations, front panel 65 for receiving user inputs and for displaying messages to a user, receptacle 70 for receiving a memory device, such as a memory card 75 from a digital camera (not shown), and a printing engine 80. Printer 10 also includes read only memory (ROM) 82 for storing programs, including a printer operating system 84 and a page layout program 86 in accordance with the invention. Printer 10 further includes random access memory (RAM) 88 for storing temporary system operating parameters and temporary data for the page layout system.

Printer 10 is optionally connected to an external computing device 90 through link 100. The external computing device 90 may be a personal computer or any device capable of communicating with printer 10, and typically includes display 93, processor 95, and storage 97.

The processor 60 executes the programs in ROM 82 either automatically, in response to user inputs from front panel 65, or in response to inputs from external computing device 90, if it is connected.

Processor 60 preferably includes a facility 62 for receiving and storing additional programs contained on computer storage media, also referred to herein as memory media 64, such as a floppy disk drive, a compact disk drive, or a memory cartridge bay. Such programs may include, for example, the printer operating system 84, the page layout program 86, programs for controlling print engine 60, programs for operating on, or in response to, various file types, including direct print order format (DPOF) files, jpeg files, or gif files, upgrades for programs already residing in read only memory (ROM) 82, and in general, programs related to printing operations and for printing images.

Figure 3:
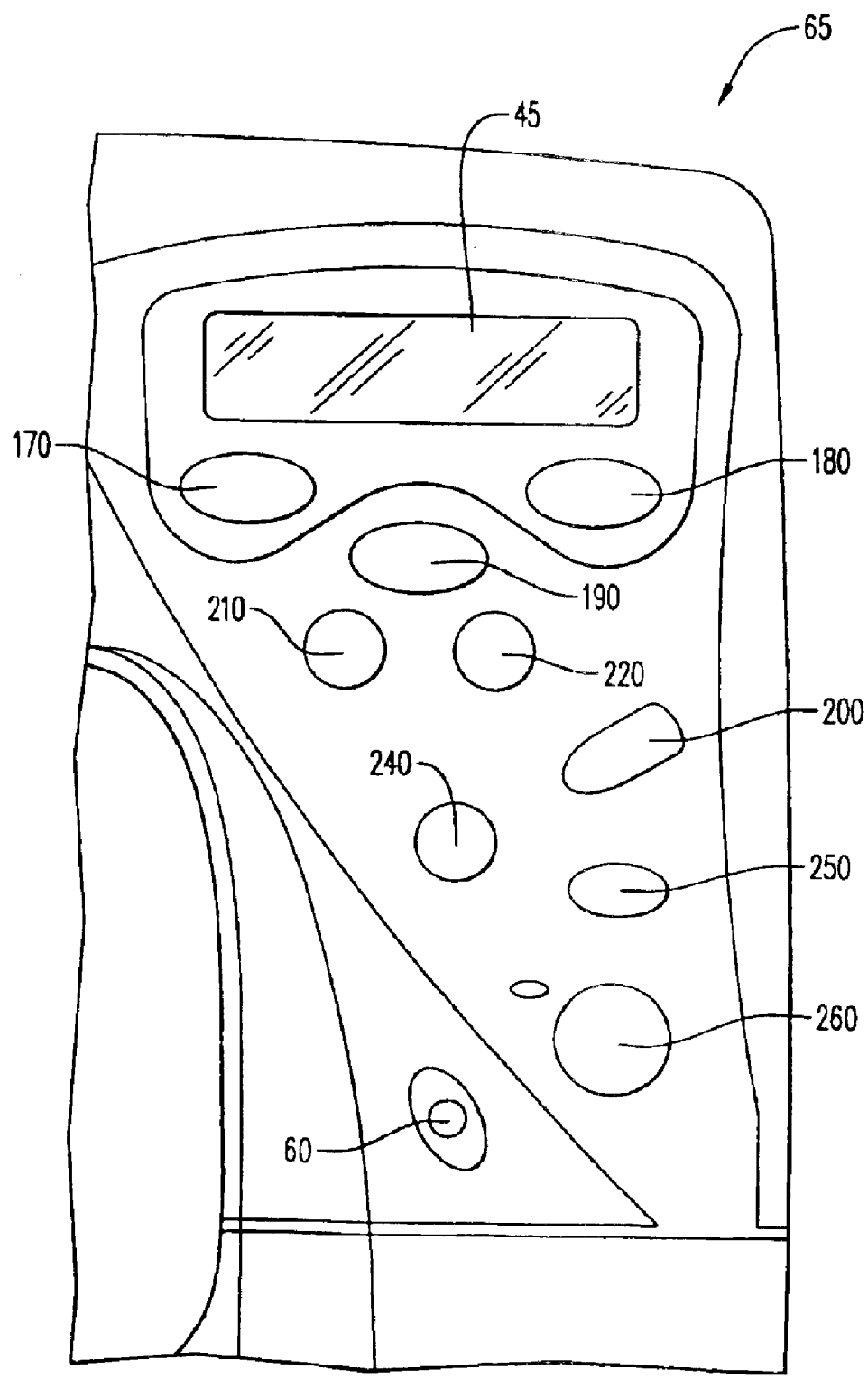
FIG. 3 is a diagram of a front panel portion of the printer, the front panel providing a user interface.

Front panel 65 is shown in greater detail in FIG. 3. Front panel 65 includes display 45 for preferably providing messages, prompts, information as to the content of memory card 75, information regarding the operation of printer 10, and other information to the user. Display 45 is preferably a 2-line, 16 characters per in liquid crystal display. Front panel 65 further includes power button 60 for turning the printer on and off, button 170 for selecting a number of copies to be printed, button 180 for selecting a printed size of an image file, button 190 for selecting image files to be printed, and button 200 to cause the printer to print the selected image files. Front panel 65 further provides button 210 to stop printing, cancel a selection presented on display 45, or to answer no to a question presented on display 45. Button 220 is also provided to make a selection presented on display 45, or to answer yes to a question presented on display 45.

Button 240 is provided for saving selected image files to external computing device 90, if it is connected, and button 250 is for changing the printer settings. The printer settings that may be changed by operating button 250 include the page layout settings, which will be explained in greater detail below.

Figure 4A:
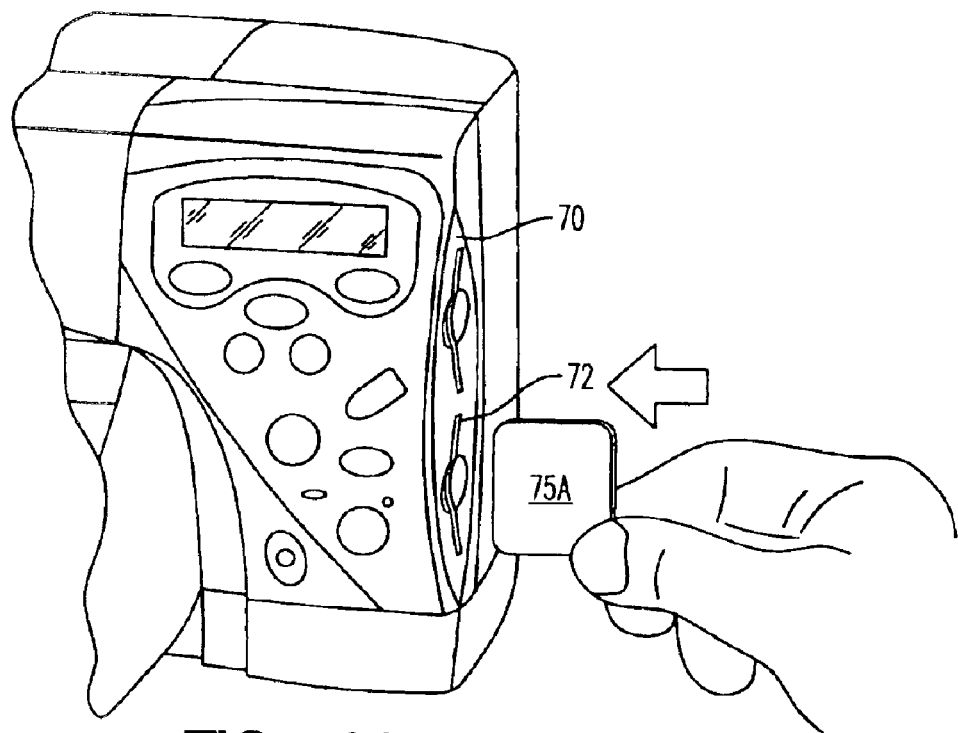
FIG. 4 shows a partial view of the printer and an apparatus for accepting memory cards.
Figure 4B:
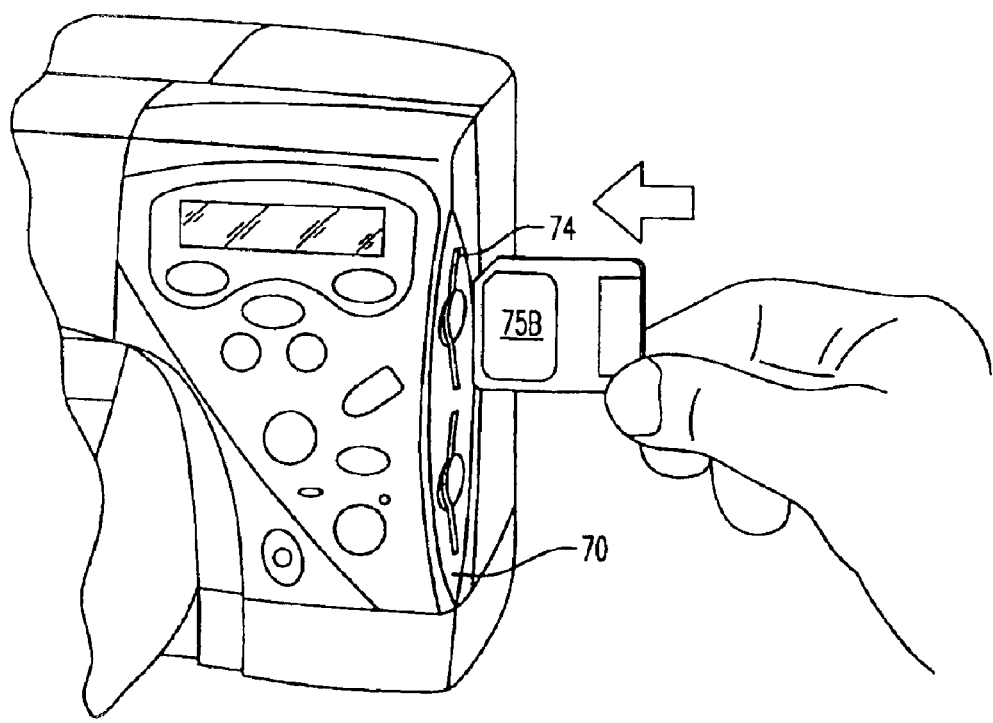

FIGS. 4A and 4B show a partial view of printer 10. Memory cards 75A and 75B are of the type used in digital cameras for storing image files. Receptacle 70 preferably includes at least one connector 72 for receiving the memory card 75A, which may be one known as a CompactFlash™ memory card, and at least one connector 74 for receiving a memory card 75B, which may be one known as a Smart-Media™ memory card.

Figures 5, 5A:
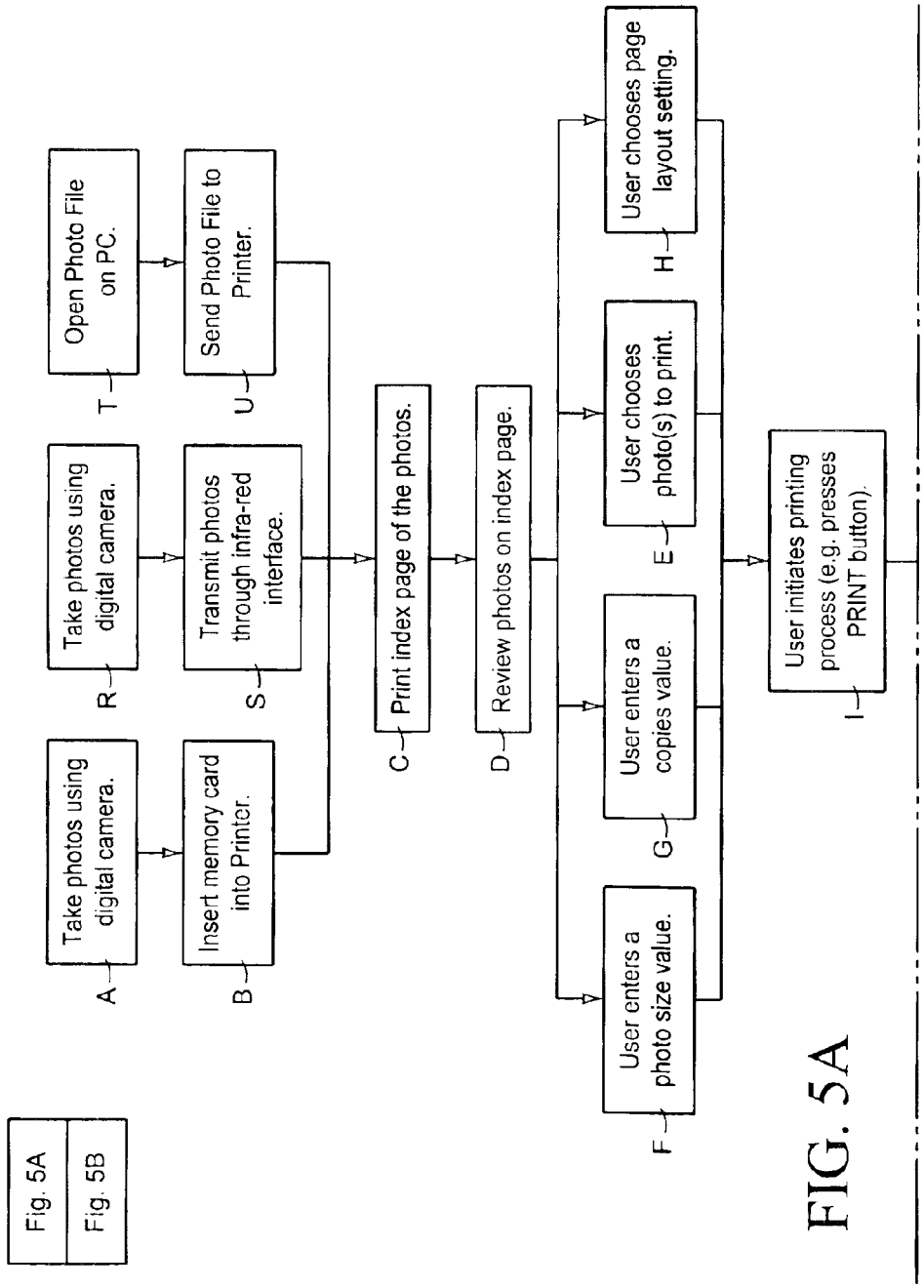
FIG. 5 is a flow chart of operations performed for printing image files.
Figure 5B:
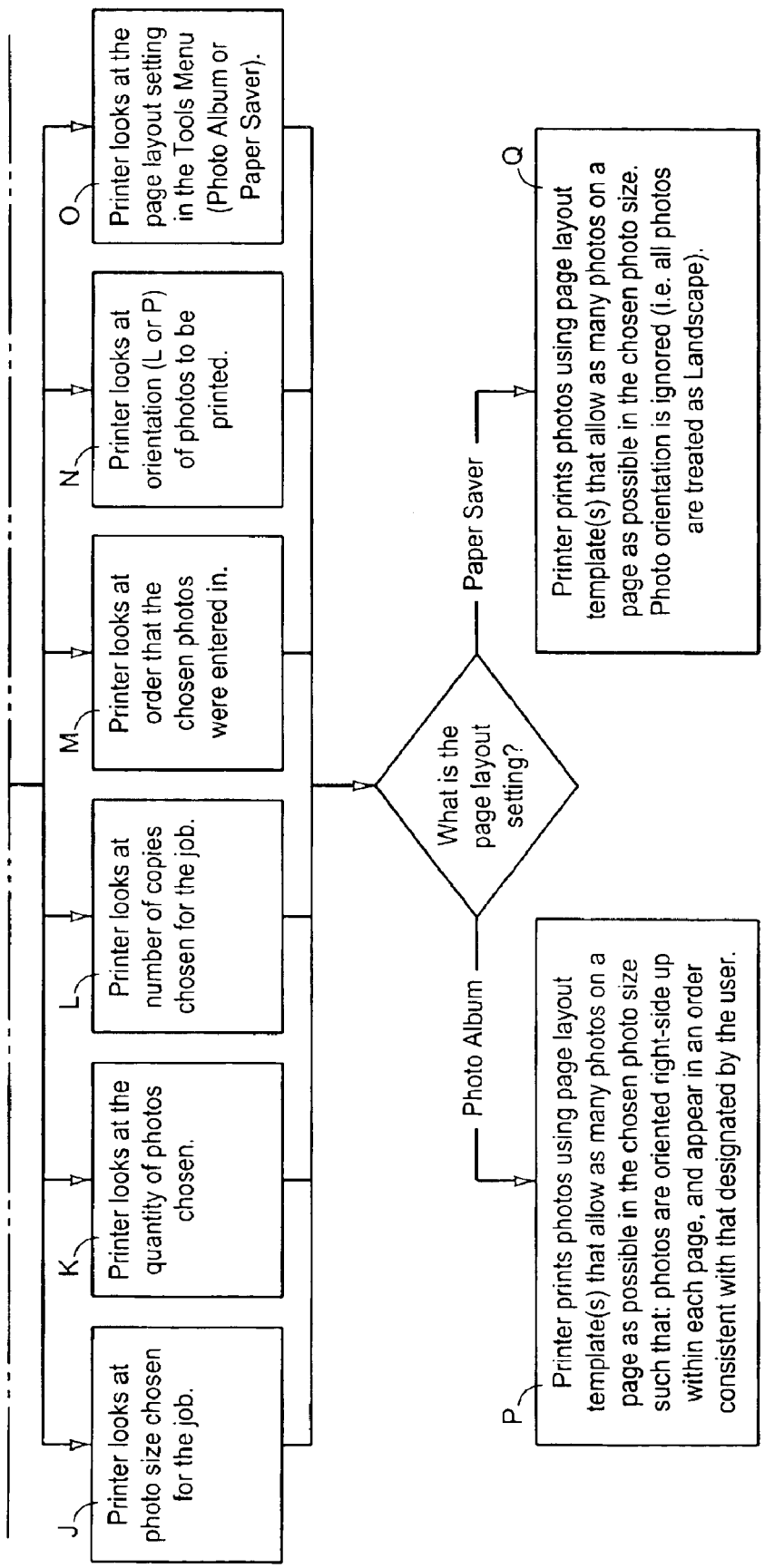

Turning now to the flowchart of FIG. 5, in accordance with the invention, in step A a user begins by taking photographs or recording images with a digital camera that stores images on memory card 75. Images are stored in memory card 75 in a digital file format, for example, a jpeg type file. Memory card 75 further includes a date, and orientation information about each image.

The user then removes memory card 75 from the digital camera and inserts it into receptacle 70 of printer 10 as in step B. When printer 10 is idle, display 45 preferably shows three fields: quantity of images chosen (top line), number of copies (bottom left), and image size (bottom right). Upon insertion of memory card 75 into receptacle 70, the printer operating system invokes page layout program 86, and display 45 preferably shows the word "Reading . . . ", as shown in FIG. 7A. Upon completion of the read step, display 45 shows the number of image files found on the memory card 75 as shown in FIG. 7B. Then display 45 displays "ALL PHOTOS, 1 copy, Index" as shown in FIG. 7C.

In step C, the user then operates the buttons on front panel 65 to cause page layout program 86 to print an index page. An index page comprises a thumbnail of each image file, and a date, filename, and number for each image file on memory card 75. The index page is useful for reviewing the image files on memory card 75 as in step D, and for selecting individual image files to be printed. Of course plural index pages may be printed, depending on the number of image files and thumbnail size.

The user then operates the front panel buttons to select which image files to print (step E). This preferably done by operating button 190 to cause display 45 to display the number corresponding to the desired image as shown in FIG. 7D. When the number of the desired image is displayed, a user operates button 220 to select the image. This process is repeated until all of the desired images have been selected. A user may also select a range of images to be printed. To select a range, the user operates button 190 until the number of the first image of the range is displayed. The user operates button 220 until a dash appears in display 45. The user then operates button 190 to select the last image of the range, and then operates button 220 to select the last image in the range of images to be selected. For all selections of images, the order in which the user selects the image files is the order in which they will be printed.

In step F, the user further operates the front panel to select an image size. The user can choose from a set of standard photo sizes, which for the U.S. are, 2½×3¼, 3×4, 3½×5, 4×6, 5×7, and 8×10 inches. When the aspect ratio of the image does not match the aspect ratio of a chosen image size, the image is cropped. The selected image files will all be printed using the selected size.

In step G, the user continues to operate the front panel buttons to specify a number of copies of the image files to be printed, and, in step H, a page layout setting. The user specifies the page layout setting by operating button 250 until a prompt appears on display 45 asking if the user desires to change the page layout. In response, the user operates button 220 to signify an affirmative answer. The user then operates button 250 to select a choice of page layouts. The choices for page layout include (1) Photo Album, and (2) Paper Saver.

The Photo Album layout setting causes page layout program 86 to arrange the image files such that all images on a page are positioned right side up, are the particular size selected, and are in their original orientation, that is, either landscape or portrait. The page orientation may change from page to page, in that, some pages are viewable in the portrait orientation, while other pages are viewable in the landscape orientation. The viewing orientation of each page is selected to allow the maximum number of images to be printed on the page while satisfying the criteria above, that is, all images on the page will appear right side up, are a user specified size, and are in their original orientation.

The orientation information about a particular image is normally provided by the source of the image file, for example, the digital camera. When orientation information is not provided by the image source, page layout program 86 uses a landscape orientation for the image files and makes decisions about the arrangement of the image files accordingly.

The Paper Saver layout setting causes page layout program 86 to arrange as many images on a page as possible, for the chosen image size. Any image orientation information from the image source is ignored, and all images are arranged in a landscape orientation. The maximum number of images per page is determined by the selected image size. The number of images per page varies, depending on the quantity of images entered and the image size chosen.

The user may optionally adjust the brightness of the images thus causing the images to print lighter or darker than specified by the image file. To adjust the brightness, the user operates button 250 until a prompt appears on display 45 asking if the user desires to adjust the brightness of the images. In response, the user operates button 220 to signify an affirmative answer. The user then operates button 250 to select a desired brightness, operating the button in one manner to lighten the images and in another manner to darken the images. In the preferred embodiment, pushing the right side of button 250 will lighten the images and pressing the left side of button 250 will darken the images.

Upon completing the selections, the user operates print button 200 as shown in step I. In response, page layout program 86 begins in step J, by identifying the image size chosen by the user. Page layout program 86 then identifies the quantity of images chosen (step K), the number of copies (step L), the order specified (step M), and the orientation (step N) of the selected images. Page layout program 86 then interrogates the page layout setting (step O) specified by the user in step H.

For a page layout setting of Photo Album, page layout program 86 then interrogates each image file on memory card 75 to identify the orientation of each of the image files selected. Page layout program 86 then groups the images in the order selected by the user. Using the size specified by the user, and the orientation of the image files, page layout program 86 then segregates the ordered image files into pages, selecting a page orientation for each page so that the maximum number of image files is printed on each page while maintaining each image's size and orientation. After this step of segregating by page, page layout program 86 then retrieves each image file from memory card 75 in the order specified by the user, rotates the file if required to print the file "right side up" and proceeds to cause the printer to print each image "right side up," in its original orientation, in the order specified by the user as shown in step P.

Figure 8:
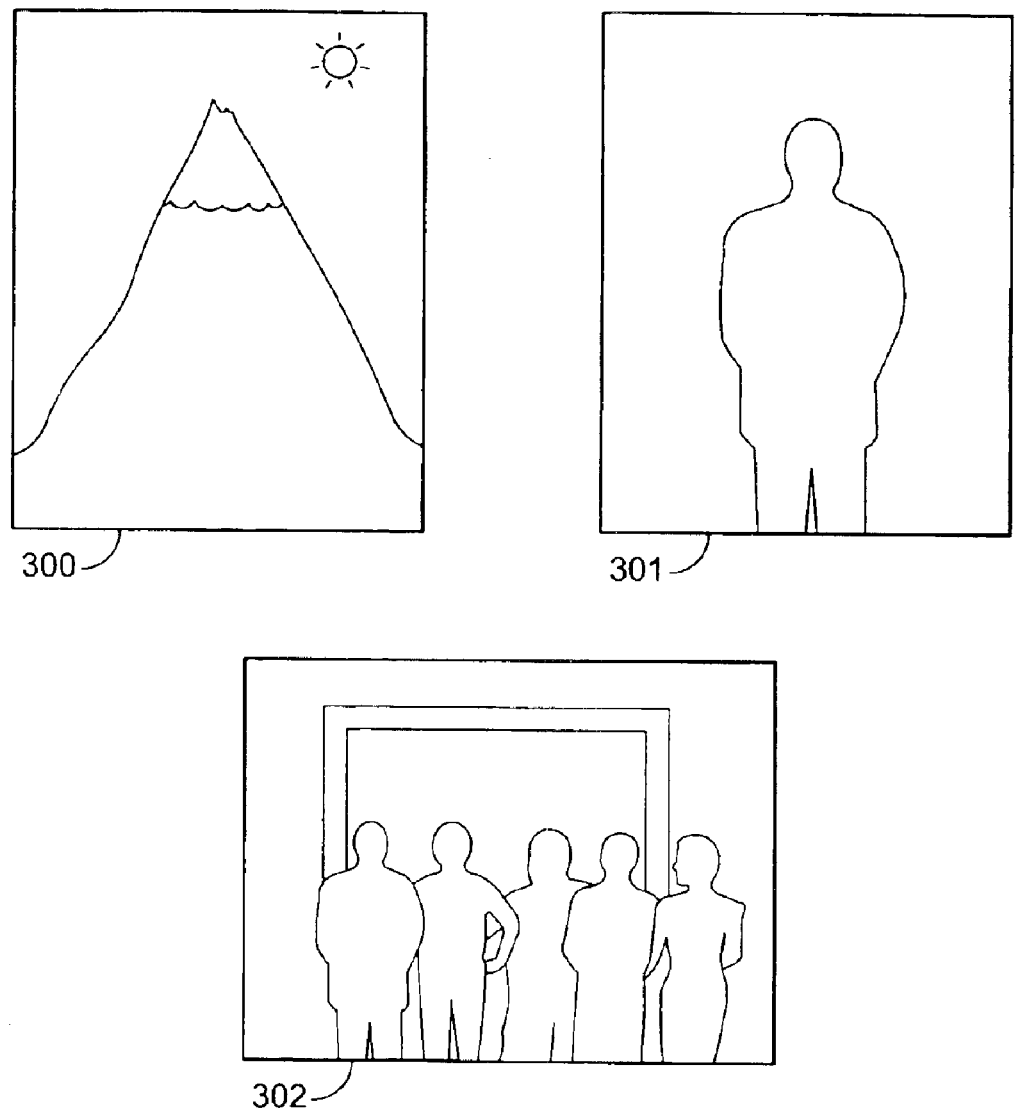
FIG. 8 shows a schematic example of image files printed using a Photo Album page layout setting.

FIG. 8 shows a schematic example of image files printed using the Photo Album page layout setting. The images are displayed in the order that the user specified, that is 300, 301, and then 302. The images are also "right side up" in their correct orientation, that is images 300 and 301 are in portrait orientation, and image 302 has a landscape orientation.

Returning to FIG. 5, for a page layout setting of Paper Saver, page layout program 86 identifies the size specified by the user in step J, and the image files specified by the user in step E. As shown in step Q, page layout program 86 then arranges the images in a landscape orientation on the page, in a way so that the maximum number of image files are printed on the page regardless of the order of the images specified, and causes the printer to print the page.

FIG. 9 shows a schematic example of image files printed using the Paper Saver page layout setting. The order of the images specified by the user was 310, 311, 312, and 313. Further the user has specified images to be printed having a landscape orientation 312, 313 and having a portrait orientation 310, 311. Consistent with the Paper Saver seting, the page layout program 86 has arranged the images in a landscape orientation on the page, regardless of their original orientation, in a way so that the maximum number of image files are printed on the page regardless of the order of the images specified.

Image files to be printed may originate from sources other than memory card 75. Returning to FIG. 2, front panel 65 further includes infra-red interface 260. A suitably equipped digital camera may transmit image data to printer 10 through infra-red interface 260. Turning to FIG. 4, in step R, the user may take photographs, or record images with a suitably equipped digital camera and then, as in step S, transmit those images to printer 10 through infrared interface 260. The user then proceeds with step C through the various steps explained above to print the desired image files.

Figure 6:
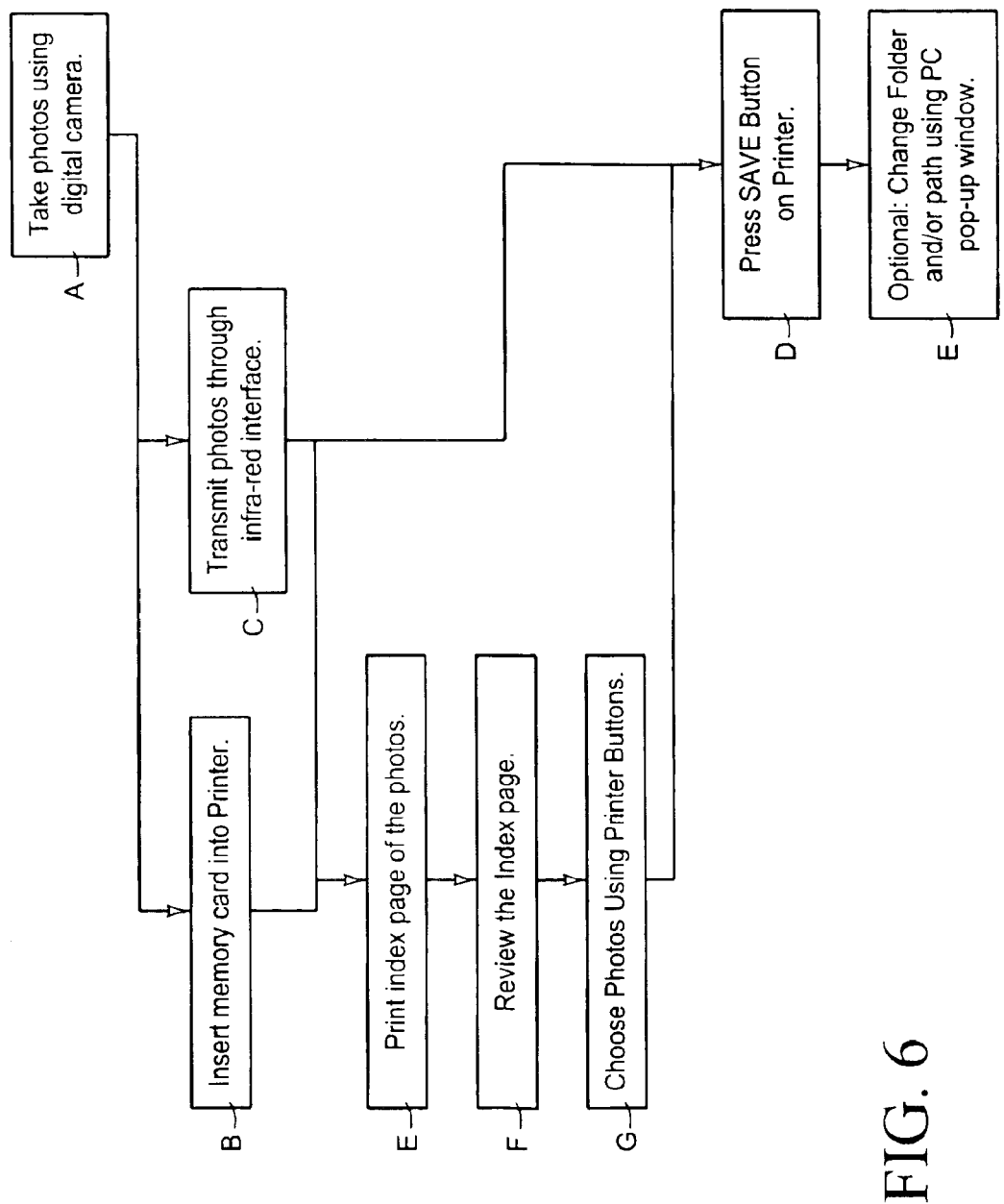
FIG. 6 is a flow chart of operations performed for saving image files.

The user may optionally store the images on external computing device 90 in storage 97. As shown in FIG. 6, in step A, the user takes photographs, or records images using a digital camera, and may insert memory card 75 from the digital camera into receptacle 70 (step B), or may transmit the images through infrared interface 260 (step C). The user may then operate button 240 on front panel 65 (FIG. 3) to save the image files to external computing device 90 as in step D. Optionally, the user may operate front panel 65 to print an index page (step E). The user may then review the index page (step F), and further operate front panel 65 to choose image files to be saved (step G). The user may then save the image files by operating button 240 (step D), as stated above. After operating button 240 to save the image files on external computing device 90, the user may optionally change or specify the file location within storage 97 on external computing device 90 as shown in step E.

Returning to FIG. 5, once stored on external computing device 90, the file containing the image files may be opened (step T) and may be sent to printer 10 (step U). The user then proceeds with step C through the various steps explained above to print the desired image files.

Thus, while the invention has been particularly shown and described with respect to preferred embodiments thereof, it will be understood by those skilled in the art that changes in form and details may be made therein without departing from its scope and spirit.

What is claimed is:

1. A printer, having a receptacle for receiving a memory card, said memory card having storage means for storing a plurality of image files, said printer further comprising:

a user interface coupled to said printer for enabling a user to enter selection commands;

a display coupled to said printer for showing messages; and processor means coupled to said printer (i) responsive to a first user input to print a sheet with reduced versions of said plurality of image files in a first sequence of the image files and (ii) responsive to another user input for specifying at least one arrangement of said plurality of image files wherein said image files are printed with a same orientation on said sheet.

2. The printer of claim 1 wherein said at least one arrangement comprises an alternate arrangement wherein said image files are arranged to fit as many image files as possible on said sheet.

3. The printer of claim 1 wherein said processor means is further responsive to another user input to print a sheet with an alternate sequence of said plurality of image files.

4. The printer of claim 1 wherein said processor means is further responsive to another user input to print selected ones of said plurality of image files.

5. The printer of claim 1 wherein said processor means is further responsive to another user input to print each of said plurality of image files at a certain size.

6. The printer of claim 1 wherein said processor means is further responsive to another user input to print a specified number of copies of each of said plurality of image files.

7. The printer of claim 5 wherein said user input is obtained from a file in said memory card.

8. The printer of claim 1 further comprising means for communicating with a personal computer, wherein said plurality of image files are present in a storage medium in said personal computer.

9. A method for controlling a printer, said printer having a receptacle for receiving a memory card, said memory card having storage means for storing a plurality of image files, said printer further comprising: a user interface coupled to said printer for enabling a user to enter selection commands; a display coupled to said printer for showing messages; and processor means coupled to said printer responsive to user input; said method comprising the steps of:

printing a sheet with reduced versions of said plurality of image files in a first sequence of the image files; and specifying at least one arrangement of said plurality of image files wherein said image files are arranged to fit as many image files as possible on said sheet.

10. The method of claim 9 wherein said step of specifying further comprises specifying at least one arrangement wherein said image files are printed with the same orientation on said sheet.

11. The method of claim 9 wherein said step of printing further comprises printing a sheet with an alternate sequence of said plurality of image files.

12. The method of claim 9 wherein said step of printing further comprises printing selected ones of said plurality of image files.

13. The method of claim 9 wherein said step of printing further comprises printing each of said plurality of image files at a certain size.

14. The method of claim 9 wherein said step of printing further comprises printing a specified number of copies of each of said plurality of image files.

15. The method of claim 9 further comprising obtaining printing parameters from a file in said memory card.

16. The method of claim 9 wherein said printer further comprises means for communicating with a personal computer, and wherein said plurality of image files are present in a storage medium in said personal computer.

17. A memory media, including instructions for controlling a printer, said printer having a receptacle for receiving a memory card, said memory card having storage means for storing a plurality of image files, said printer further comprising: a user interface coupled to said printer for enabling a user to enter selection commands; a display coupled to said printer for showing messages; and a processor coupled to said printer responsive to user input; said memory media comprising:

means for controlling said processor to print a sheet with reduced versions of said plurality of image files in a first sequence of the image files; and means for controlling said processor to specify at least one arrangement of said plurality of image files wherein said image files are arranged to fit as many image files as possible on said sheet.

18. The memory media of claim 17 wherein said means for controlling said processor to specify further comprises means for controlling said processor to specify at least one arrangement wherein said image files are printed with the same orientation on said sheet.

19. The memory media of claim 17 wherein said means for controlling said processor to print further comprises means for controlling said processor to print a sheet with an alternate sequence of said plurality of image files.

20. The memory media of claim 17 wherein said means for controlling said processor to print further comprises means for controlling said processor to print step of printing further comprises printing selected ones of said plurality of image files.

21. The memory media of claim 17 wherein said means for controlling said processor to print further comprises means for controlling said processor to print each of said plurality of image files at a certain size.

22. The memory media of claim 17 wherein said means for controlling said processor to print further comprises means for controlling said processor to print a specified number of copies of each of said plurality of image files.

23. The memory media of claim 17 further comprising means for controlling said processor to obtain printing parameters from a file in said memory card.

24. The memory media of claim 17 wherein said printer further comprises means for communicating with a personal computer, and wherein said plurality of image files are present in a storage medium in said personal computer.

* * * * *